United States Patent
Mader et al.

(10) Patent No.: US 6,513,832 B1
(45) Date of Patent: Feb. 4, 2003

(54) CONTROL SYSTEM FOR VEHICLE OCCUPANT PROTECTION DEVICE IN A MOTOR VEHICLE

(75) Inventors: Gerhard Mader, Thalmassing (DE); Claus Schmidt, Regensburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/889,058

(22) PCT Filed: Jan. 12, 2000

(86) PCT No.: PCT/DE00/00089

§ 371 (c)(1),
(2), (4) Date: Sep. 26, 2001

(87) PCT Pub. No.: WO00/41918

PCT Pub. Date: Jul. 20, 2000

(30) Foreign Application Priority Data

Jan. 12, 1999 (DE) .......................................... 199 00 845

(51) Int. Cl.[7] .............................................. B60R 21/32
(52) U.S. Cl. ....................................... 280/735; 180/282
(58) Field of Search ................................ 280/734, 735; 180/282; 701/45

(56) References Cited

U.S. PATENT DOCUMENTS

| 5,234,228 | A | * | 8/1993 | Morota et al. .............. 180/273 |
|---|---|---|---|---|
| 5,440,913 | A | * | 8/1995 | Crispin et al. .............. 180/282 |
| 5,513,109 | A | * | 4/1996 | Fujishima .................... 180/274 |
| 5,742,916 | A | | 4/1998 | Bischoff et al. |
| 5,758,899 | A | * | 6/1998 | Foo et al. ................. 280/730.2 |
| 5,900,807 | A | * | 5/1999 | Moriyama et al. .......... 180/282 |
| 6,023,664 | A | * | 2/2000 | Bennet ......................... 701/45 |
| 6,186,539 | B1 | * | 2/2001 | Foo et al. .................... 280/735 |
| 6,243,632 | B1 | * | 6/2001 | Jung ........................... 180/268 |
| 6,256,562 | B1 | * | 7/2001 | Frimberger et al. ......... 180/282 |
| 6,256,563 | B1 | * | 7/2001 | Blank et al. ................. 180/271 |
| 6,353,782 | B1 | * | 3/2002 | Kunimi et al. .............. 280/735 |

FOREIGN PATENT DOCUMENTS

| DE | 38 16 589 A1 | 5/1988 |
|---|---|---|
| DE | 196 45 952 A1 | 11/1996 |
| WO | 89/11986 | 12/1989 |
| WO | 98/19171 | 5/1998 |

* cited by examiner

Primary Examiner—Paul N. Dickson
Assistant Examiner—Ruth Ilan
(74) Attorney, Agent, or Firm—Morrison & Foerster LLP

(57) ABSTRACT

A control system for vehicle occupant protection device in a motor vehicle has a sensor device with an X-Y acceleration sensor and a further analog sensor. The acceleration signal of the analog sensor which is rotated in its sensitivity axis by preferably 45° with respect to one of the sensitivity axes of the X-Y acceleration sensor is used here as a safing signal for checking the acceleration signals supplied by the X-Y acceleration sensor.

6 Claims, 3 Drawing Sheets

CONTROL SYSTEM FOR VEHICLE OCCUPANT PROTECTION DEVICE IN A MOTOR VEHICLE

CLAIM FOR PRIORITY

This application claims priority of International Application No. PCT/DE00/00089 which was published in the German language on Jan. 12, 2000.

BACKGROUND OF THE INVENTION

EP 0 419 455 B1 discloses a control system for triggering a restraining means in a motor vehicle in which a sensor device supplies a longitudinal acceleration signal and a transverse acceleration signal. A triggering signal for the restraining means for protection against head-on impacts is generated as a function of the longitudinal acceleration signal and the transverse acceleration signal by a downstream evaluation device of the control system.

A control system for triggering a restraining means in a motor vehicle is disclosed in U.S. Pat. No. 4,933,570. A triggering signal for the restraining means is generated as a function of a signal supplied by an acceleration sensor and a switching signal of a mechanical acceleration switch. Such sensors, which are embodied as acceleration switches and referred to as safing sensors, ensure that the triggering of the restraining means is prevented if the acceleration sensor or the evaluation device operates incorrectly and consequently supplies a faulty triggering signal. Such an acceleration switch in the firing circuit usually has a low response threshold and as a result supplies a time window within which triggering can take place on the basis of an evaluation of the signals supplied by the acceleration sensor.

Multi-channel control systems for vehicle occupant protection, i.e. in control systems having a plurality of differently oriented acceleration sensors, each individual sensor can be assigned a redundant sensor with the properties of a safing sensor—for example a mechanical acceleration switch. In a control system with two channels, four acceleration sensors/switches would consequently be necessary in order to be able to detect the failure of a channel. Such a control system with four acceleration sensors is costly in terms of components and requires a large installation space owing to the safing sensors which continue to have relatively large dimensions.

DE 196 45 952 A1 discloses a control system for triggering a restraining means in a motor vehicle which has a sensor device with three longitudinal acceleration sensors. The acceleration sensors are arranged in a star shape such that they each have differently oriented sensitivity axes. In a downstream evaluation device it is possible to determine the direction and the strength of an acceleration acting on the vehicle from the signals of only two of the three acceleration sensors. The signal of the third acceleration sensor is used here to check one of the two calculated variables, the direction or the strength of the acceleration acting on the vehicle.. The third sensor assumes the function of a safing sensor, and can prevent the triggering of the restraining means if the value made available by it deviates significantly from a value calculated beforehand from the signals of the two other sensors.

SUMMARY OF THE INVENTION

In one embodiment of the invention, there is a control system for a vehicle occupant protection device in a motor vehicle, a sensor device having at least one acceleration sensor with two sensitivity axes which are perpendicular to one another and which lie in a plane parallel to a plane defined approximately by a vehicle longitudinal axis and a vehicle transverse axis; and an additional acceleration sensor with a sensitivity axis which lies parallel to the plane which is parallel to the plane defined by the vehicle longitudinal axis and the vehicle transverse axis; the sensitivity axis of said acceleration sensor enclosing with one of the sensitivity axes of the acceleration sensor an angle which can have a value between 15° and 75°; an evaluation device to evaluate acceleration signals which are supplied by the acceleration sensor, and to generate a triggering signal to trigger the vehicle occupant protection device; and a switching unit which is connected to the evaluation device and outputs a firing signal as a function of the triggering signal and another signal, wherein a reference value is formed from the acceleration signals of the acceleration sensor in a safing evaluation unit, and wherein the acceleration sensor is an X-Y acceleration sensor, in the case of a significant deviation of an acceleration signal supplied by the additional acceleration sensor from the reference value, a disable signal is generated and supplied to the switching unit which prevents the firing signal for triggering the vehicle occupant protection device from being output even if a triggering signal is generated by the evaluation device, and a threshold value is formed in the safing evaluation unit from at least one of the received acceleration signals, and in that the:disable signal is prevented from being output to the switching unit only if the threshold value is exceeded by at least one of the acceleration signals.

In one aspect of the invention, a direction and a strength of an acceleration acting on the motor vehicle are determined in the evaluation device from the acceleration signals supplied by the X-Y acceleration sensor, and an acceleration signal which is supplied by the acceleration sensor and generates a fault situation signal is used if a significant difference is detected with respect to the direction and the strength from the acceleration signals.

In another aspect of the invention, the acceleration signal which is generated by the acceleration sensor is compared with the acceleration signals in a safing evaluation unit.

In still another aspect of the invention, the reference value is formed in the safing evaluation unit from the acceleration signals of the X-Y acceleration sensor, and a fault situation signal which is generated when there is a significant deviation of the acceleration signal from the reference value preventings the triggering of the vehicle occupant protection device.

In yet another aspect of the invention, the fault situation signal is a disable signal which is supplied to the switching unit and prevents a firing signal for the vehicle occupant protection device from being output even if a triggering signal is generated by the evaluation device.

In another aspect of the invention, the disable signal simultaneously triggers a warning device of the vehicle occupant protection device.

BRIEF DESCRIPTION OF THE DRAWINGS

The invention and its developments are described in more detail by exemplary embodiments in the drawings, in which.

DETAILED DESCRIPTION OF THE PREFERRED EMBODIMENTS

One embodiment of the invention provides a multichannel control system for protecting the vehicle occupants, a safing function which detects malfunctions and which can be implemented by a small number of cost effective standard components.

A particular advantage compared to a conventional safing concept with three analog sensors, i.e. a system for monitoring the plausibility of the signals supplied by two sensors using the signal generated by the third sensor, lies in the simplification of the signal processing and in the reduction of the costs. It is possible to apply a conventional crash algorithm using a cost effective X-Y crash sensor which is manufactured in large numbers. This constitutes a significant saving in comparison with the use of a plurality of separate analog sensors. In addition, the microprocessor which is preferably used in a downstream evaluation unit is subject to relatively low loading compared to the computational effort which is necessary with a 120° star arrangement of three analog sensors.

Figure 1:
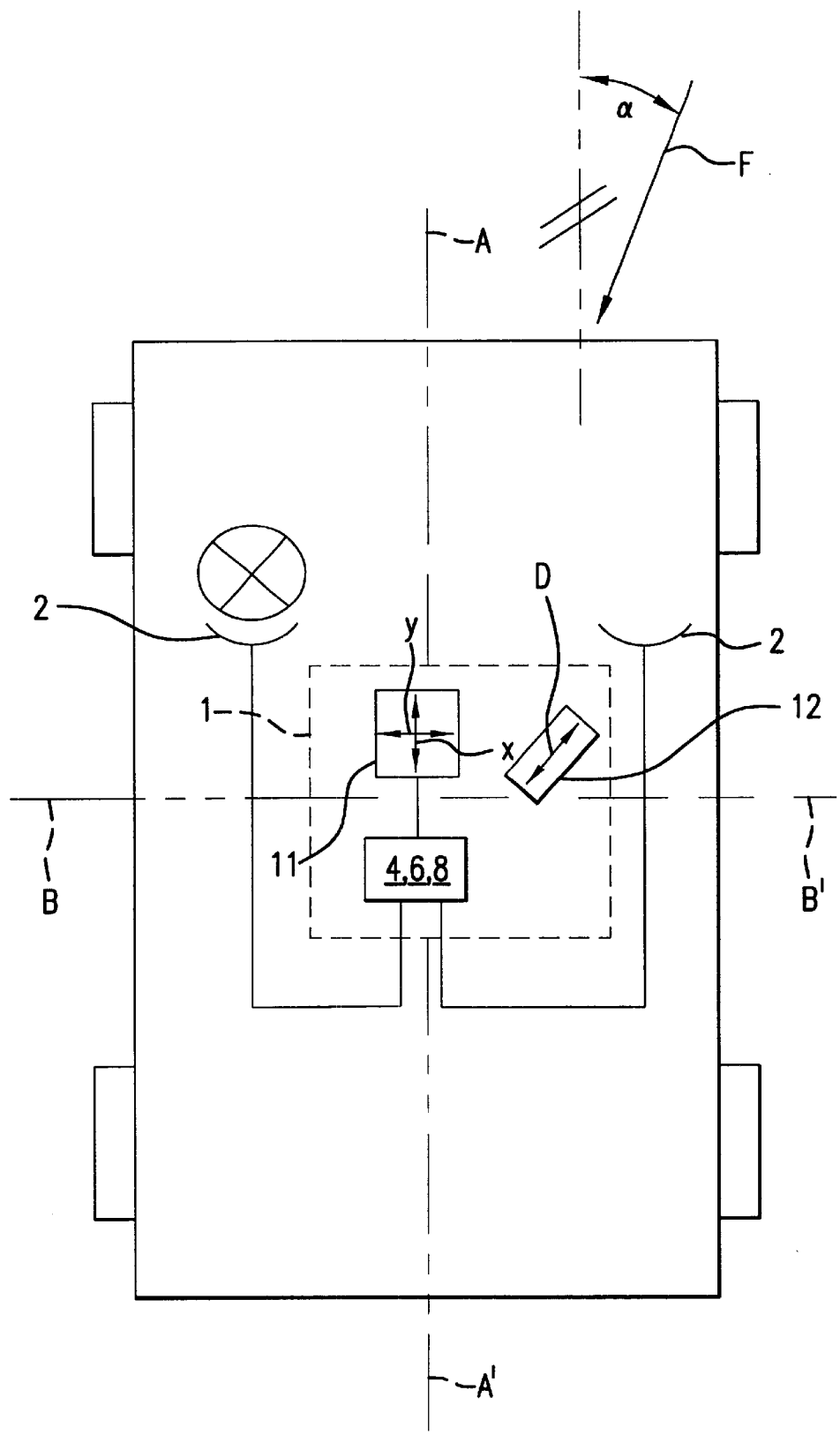
FIG. 1 shows a vehicle with a sensor device of the control system according to the invention.

FIG. 1 shows the control system according to the invention in a motor vehicle. A vehicle longitudinal axis A–A' and a vehicle transverse axis B–B' can be seen. In an approximately central installation position in the vehicle there is a control unit 1 for evaluating the vehicle occupant protection device. The control unit 1 includes an X-Y acceleration sensor 11, a further acceleration sensor 12 and devices 4, 6, 8 for sensing and evaluating the signals supplied by the acceleration sensors 11, 12 and for actuating the vehicle occupant protection device. A central installation position of the control device 1 in the vehicle, in particular, as an installation position of the X-Y acceleration sensor 11 and of the acceleration sensor 12, also referred to below as analog sensor 12, in or near to the center of gravity of the vehicle. The control device 1 may be embodied as a central unit; but an embodiment with separate components 11, 12, 4, 6, 8 is also possible.

In FIG. 1, driver and front seat passenger airbags 2 are indicated as vehicle occupant protection devices by way of example. For example, side airbags and head airbags, seatbelt pretensioning devices, referred to as active headrests (i.e. headrests which reduce the distance from the head as a function of the displacement of the head and body during and after an impact), extendable roll bars etc. are possible as further vehicle occupant protection devices. Wherever vehicle occupant protection or restraint devices are mentioned in the present context, the aforesaid protection devices are therefore included.

The X-Y acceleration sensor 11 has two sensitivity axes x, y which define a plane which is parallel to the plane formed from the vehicle longitudinal axis A–A' and vehicle transverse axis B–B'. The sensitivity axes x, y of the X-Y acceleration sensor 11 can each be oriented parallel to the vehicle longitudinal axes. However, any other orientation is equally possible and expedient. There is no functional restriction associated with different arrangements. The strength and angle of an impact can be acquired solely from the signals supplied by the X-Y acceleration sensor 11. Such an exemplary impact direction obliquely from the front right is indicated by the oblique arrow F, which is inclined by an angle α with respect to the vehicle longitudinal axis A–A'.

The analog sensor 12 has a sensitivity axis D which lies parallel to the plane defined via the sensitivity axes x and y.

In order to be able to function as a plausibility testing system, i.e. a safing sensor, the sensitivity axis D of the analog sensor 12 should lie at a significant angle to the sensitivity axis x or to the axis y of the X-Y acceleration sensor. For example, an angle δ of 45° or of 135° enclosed between the axes D and x is advantageous. Other angular values do not adversely affect the function either provided that the angle between the sensitivity axes D and x (D and y) is not less than approximately 15°. If the angular differences were smaller, it would be difficult to ensure the desired function owing to unavoidable measuring inaccuracies and the resulting risk of the measuring differences in the output signals no longer being detectable.

Figure 2:
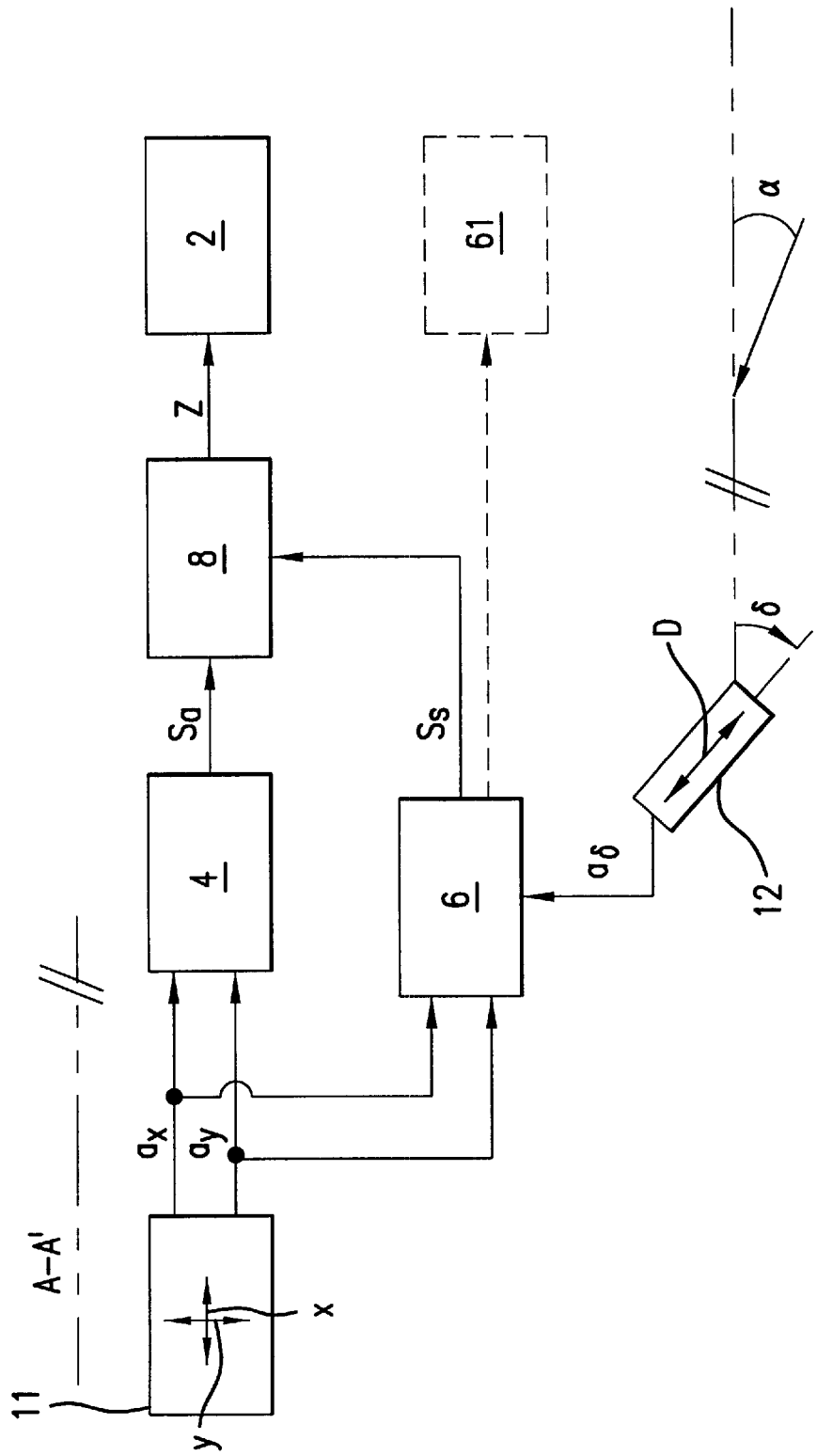
FIG. 2 shows a block circuit diagram of the control system according to the invention.

FIG. 2 shows a block circuit diagram of a first embodiment of the control system, the sensitivity axis x of the X-Y acceleration sensor 11 being provided parallel to the vehicle longitudinal axis A–A'. The sensitivity axis y, which is perpendicular to it, lies accordingly parallel to the vehicle transverse axis B–B' (not shown). The X-Y acceleration sensor 11, preferably a dual-channel analog sensor, is electrically connected to an evaluation device 4, which is preferably embodied as a microprocessor, and supplies its acceleration signals $a_x$, $a_y$ to said evaluation device 4. Positive or negative signals are generated depending on the direction in the negative or positive x and y directions and the detected strength of an impact. The evaluation device 4 evaluates the acceleration signals $a_x$, $a_y$ and, depending on the direction and strength F of the acceleration acting on the vehicle, generates a triggering signal $S_a$ for triggering the vehicle occupant protection device. The individual triggering signal $S_a$ which is indicated represents the totality of the triggering signals which are generated by the central evaluation device and which are used to actuate the various vehicle occupant protection device provided in the respective application. The triggering signal $S_a$ is transmitted to a switching unit 8 which can generate a firing signal Z for the vehicle occupant protection device 2.

The further acceleration sensor or analog sensor 12 can also be seen with a sensitivity axis D extending obliquely to the axes x and y. In the illustrated example, the angle δ between the sensitivity axis D and the vehicle longitudinal axis A–A', and thus also the sensitivity axis x parallel to it, is approximately 45°. In the impact angle α of approximately 30° which is selected by way of example, this would mean a relatively large deflection of the analog sensor 12, which would correspond approximately to the actual impact strength F. In the selected example, the absolute value of the deflection in the direction of the vehicle longitudinal axis A–A' can be determined from the output signal as of the analog sensor 12 from $$a_\delta = K_{12} * F * \cos(\alpha - \delta)$$
$$= K_{12} * F * \cos(30° - 45°)$$
$$= K_{12} * F * \cos(-15°),$$

$K_{12}$ representing a hardware-dependent constant for adapting the output signal $a_\delta$ of the analog sensor 12.

The impact angle α which is selected by way of example or which is the actual angle is not necessarily required for the safing function of the control system. The basic method of operation is based on calculating an expected (weighted) value R for $a_\delta$ from the signals $a_x$ and $a_y$, and then comparing the value with the actually measured output signal $a_\delta$ of the analog sensor 12. If R and $a_\delta$ correspond within a defined tolerance window, a fault situation signal is not generated, or an enable signal can be generated.

The analog sensor 12 supplies the acceleration signal $a_\delta$ to a safing evaluation unit 6. Because the safing evaluation unit 6 also processes the acceleration signals $a_x$ and $a_y$, it can form from them in each case a reference value R which is to be compared with the expected safing acceleration signal $a_\delta$. Given a significant deviation between the two signals, a disable signal $S_s$ is generated and transmitted to the switching unit 8. In this way, it is possible in the selected exemplary embodiment to define a reference value $R_x$ for the acceleration signal $a_x$ in the x direction with $$R_x = K_{11} * F * \cos \alpha,$$

the output signal $a_x$ of the X-Y acceleration sensor being selected with a positive value in the direction of the vehicle longitudinal axis A–A', given an acceleration counter to the direction of travel, i.e. in the case of an impact from the front. The factor $K_{11}$ constitutes in turn a constant for adapting the reference signal $R_x$. In the same way, a reference value $R_y$ for the acceleration signal $a_y$ can be defined in the y direction $$R_y = K_{11} * F * \sin \alpha,$$

the output signal $a_y$ of the X-Y acceleration sensor being selected with a positive value in the direction of the vehicle transverse axis B–B', given an acceleration component from the right (in the direction of travel). The reference values $R_x$ and $R_y$ can, given a suitable selection of the constants $K_{11}$ and $K_{12}$, be treated in each case as equivalent with the acceleration signal $a_\delta$ for the deflection of the analog sensor 12 in the vehicle longitudinal direction in order to generate the disable signal $S_s$ from it if significant deviation occurs.

In a more general form, the safing function can be formulated as follows:

$$R = K_{11} * (a_x + a_y),$$

where $$R = K_{12} * a_\delta$$

applies, functioning of the sensors should be detected. The basic method of operation of the safing function of the control system is apparent once more from this, namely the formation of a theoretical (weighted) value R for the output signal of a third sensor 12 from the output signals of an X-Y acceleration sensor 11 and the subsequent comparison of the theoretical value R with the actual output signal $a_\delta$ of the sensor 12.

When the disable signal $S_s$ is received, the switching unit 8 prevents a firing signal Z from being output to the restraining device 2 despite the reception of a triggering signal $S_a$. As mentioned above, the switching unit 8 represents a multiplicity of switching units for generating a plurality of firing signals if a multiplicity of vehicle occupant protection device are provided in the vehicle.

In one preferred development of the control system according to the invention, the acceleration signals $a_x$, $a_y$, $a_\delta$ which are supplied to the safing evaluation unit 6 by the acceleration sensors 11, 12 are used simultaneously to form a threshold value SW. This may comprise a simple threshold value analysis of just one, of two or even of all three acceleration signals $a_x$, $a_y$, $a_\delta$. However, the signals are expediently acquired logarithmically and/or integrals are formed over time with subsequent integral evaluation in order to obtain more reliable information on the course of a crash.

Such a threshold value analysis prevents a situation in which even when the vehicle is stationary or traveling very slowly a firing signal Z can be enabled in the switching unit 8. Instead, a disable signal $S_s$ is generated by the safing evaluation unit 6 as long as the predetermined threshold value SW is not exceeded by the signal of at least one sensitivity axis of the acceleration sensors 11, 12. The safing function is enabled only if at least one value of an acceleration signal $a_x$, $a_y$, $a_\delta$ exceeds the predetermined threshold value SW (as an individual value or as an integral over time).

Furthermore, a warning device 61 which may be provided as an option is shown and it can be configured, for example, as an optical signal transmitter or some other display unit. It is also conceivable to output a fault signal to a memory device or diagnostic device so that rapid detection and recovery of the fault by service personnel is possible.

The advantage of this arrangement lies in the fast and reliable signal processing in the microprocessor of the evaluation device 4; the acceleration signals $a_x$, $a_y$ of the X-Y acceleration sensor are processed there. The safety monitoring of the triggering signal $S_a$ generated by the evaluation device takes place here exclusively in the safing evaluation unit 6 which is separate from the evaluation device 4. While the processor in the evaluation device therefore needs to be concerned with the signals from the X-Y sensor, the safing evaluation device tests these sensor signals for plausibility. Furthermore, criteria are defined which the sensor signals have to fulfill for a ready-to-fire state to be generated. In addition, if the processor also outputs an enable signal, the triggering device for the restraining device can be fired. The safing evaluation unit 6 can either be embodied separately from the analog sensor 12 or in one unit with it.

Figure 3:
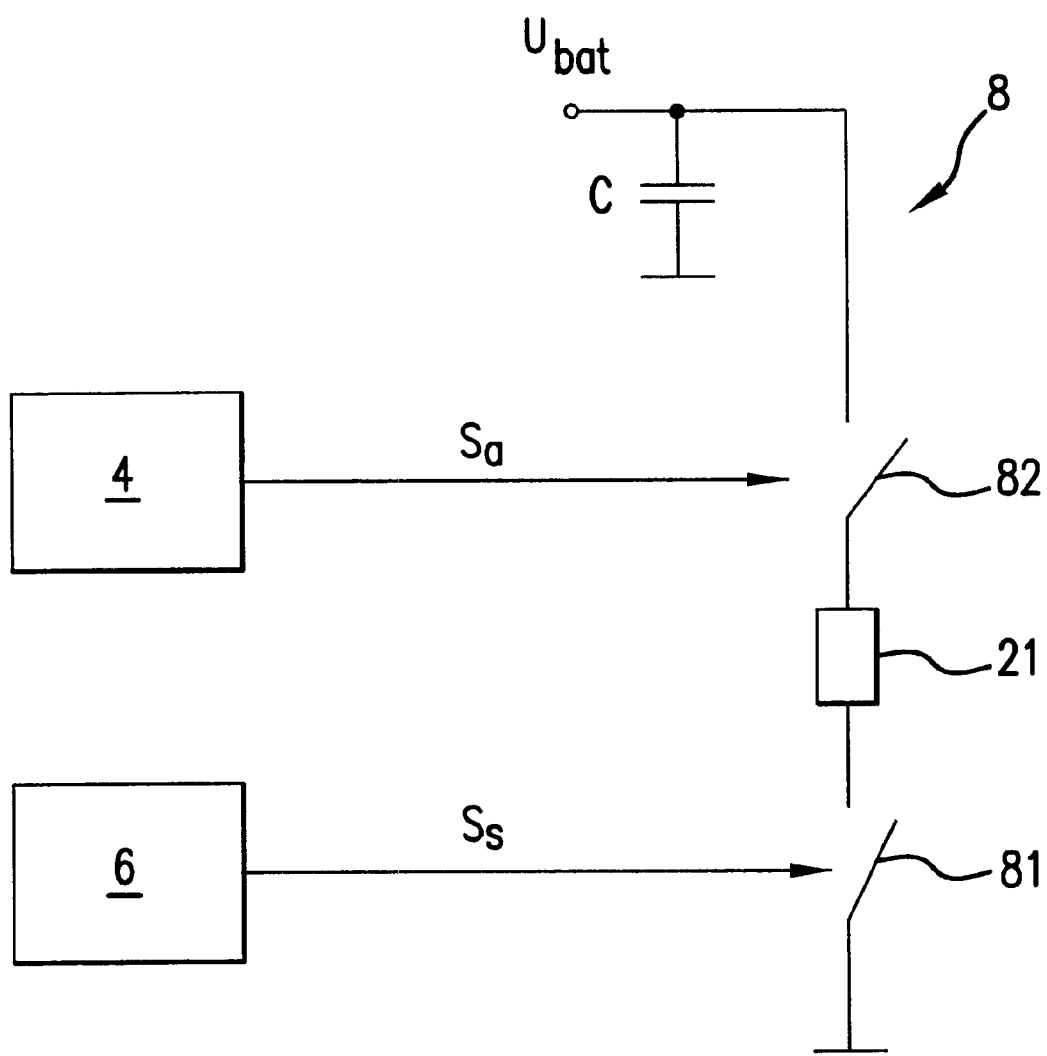
FIG. 3 shows a block circuit diagram of a subfunction of the control system according to FIG. 2.

FIG. 3 shows an exemplary arrangement of the switching unit 8 comprising a firing element 21 which is located between two switches 81 and 82 in the vehicle's electrical system. The switches 81 and 82 are preferably embodied as transistor switches. The voltage supply in the vehicle $U_{bat}$ ensures that there is a loaded firing capacitor C which, when the switches 81 and 82 are closed, can discharge to earth and in doing so ensures that the firing element 21 symbolized by a resistor is heated. If the evaluation device 4 has detected an impact, it supplies a triggering signal $S_a$ which ensures that the (transistor) switch 82 closes. However, firing cannot take place until the plausibility check in the safing evaluation unit 6 has detected no fault and supplied no disable signal $S_s$ to the switch 81. If these do occur, the (transistor) switch 81 remains open, i.e. no firing takes place.

The control system according to the invention has, compared to conventional safing concepts which usually have three analog sensors in a star arrangement with an angular relationship of, in each case, 120° with respect to one another, in particular the advantage that the conventional algorithms for performing crash detection and triggering vehicle occupant protection devices as a function thereof which are directly made available by the acceleration signals $a_x$, $a_y$ of the X-Y acceleration sensor 11 can readily be used.

In this way, lower loading of the microprocessor which is usually provided in the evaluation device 4 is also ensured because only the two signals $a_x$, $a_y$ of the X-Y acceleration sensor 11 are processed instead of the signals from three analog sensors. It is also advantageous that, instead of two separate analog sensors, an integrated X-Y acceleration sensor 11 is used, as a result of which the control system can be implemented more cost effectively.

What is claimed is:

1. A control system for vehicle occupant protection device in a motor vehicle, comprising:

a sensor device having at least one X-Y acceleration sensor with two sensitivity axes which are perpendicular to one another and which lie in a plane parallel to a plane defined approximately by a vehicle longitudinal axis and a vehicle transverse axis; and an additional acceleration sensor with a sensitivity axis which lies parallel to the plane which is parallel to the plane defined by the vehicle longitudinal axis and the vehicle transverse axis;

the sensitivity axis of said acceleration sensor enclosing with one of the sensitivity axes of the X-Y acceleration sensor an angle which can have a value between 15° and 75°;

an evaluation device to evaluate acceleration signals which are supplied by the X-Y acceleration sensor, and to generate a triggering signal to trigger the vehicle occupant protection device; and a switching unit which is connected to the evaluation device and outputs a firing signal as a function of the triggering signal and another signal, wherein a reference value is formed from the X-Y acceleration signals of the acceleration sensor in a safing evaluation unit, and wherein in the case of a significant deviation of an acceleration signal supplied by the additional acceleration sensor from the reference value, a disable signal is generated and supplied to the switching unit which prevents the firing signal for triggering the vehicle occupant protection device from being output even if a triggering signal is generated by the evaluation device, and a threshold value is formed in the safing evaluation unit from at least one of the received acceleration signals, and in that the disable signal is prevented from being output to the switching unit only if the threshold value is exceeded by at least one of the acceleration signals.

2. The control system as claimed in claim 1, wherein a direction and a strength of an acceleration acting on the motor vehicle are determined in the evaluation device from the acceleration signals supplied by the X-Y acceleration sensor, and an acceleration signal which is supplied by the additional acceleration sensor and generates a fault situation signal is used if a significant difference is detected with respect to the direction and the strength from the acceleration signals.

3. The control system as claimed in claim 1, wherein the acceleration signal which is generated by the additional acceleration sensor is compared with the acceleration signals supplied by the X-Y acceleration sensor in a safing evaluation unit.

4. The control system as claimed in claim 3, wherein the reference value is formed in the safing evaluation unit from the acceleration signals of the X-Y acceleration sensor, and a fault situation signal which is generated when there is a significant deviation of the acceleration signal generated by the additional acceleration sensor from the reference value preventing the triggering of the vehicle occupant protection device.

5. The control system as claimed in claim 4, wherein the fault situation signal is the disable signal which is supplied to the switching unit and prevents a firing signal for the vehicle occupant protection device from being output even if a triggering signal is generated by the evaluation device.

6. The control system as claimed in claim 5, wherein the disable signal simultaneously triggers a warning device of the vehicle occupant protection device.

* * * * *